United States Patent
Akachi et al.

[11] Patent Number: 5,808,387
[45] Date of Patent: Sep. 15, 1998

[54] ELECTRIC MOTOR FOR AN ELECTRIC VEHICLE

[75] Inventors: Hisateru Akachi, Sagamihara; Tatsuyuki Yamamoto, Isehara; Hiroshi Yamashita, Ebina, all of Japan

[73] Assignees: Actronics Co., Ltd., Tokyo; Nissan Motor Co., Ltd., Kanagawa-ken, both of Japan

[21] Appl. No.: 547,519

[22] Filed: Oct. 24, 1995

[30] Foreign Application Priority Data

Oct. 25, 1994 [JP] Japan .................................. 6-260515

[51] Int. Cl.⁶ .................................................... H02K 9/00
[52] U.S. Cl. ................................ 310/54; 310/55; 310/58; 310/64; 310/60 A; 310/216
[58] Field of Search ................................ 310/54, 55, 58, 310/64, 60 A, 216, 65

[56] References Cited

U.S. PATENT DOCUMENTS

| | | | |
|---|---|---|---|
| 3,109,947 | 11/1963 | Thompson et al. | 310/64 |
| 3,681,628 | 8/1972 | Krastchew | 310/54 |
| 3,715,610 | 2/1973 | Brinkman | 310/54 |
| 3,765,480 | 10/1973 | Fries | 165/86 |
| 3,801,843 | 4/1974 | Corman et al. | 310/52 |
| 4,590,993 | 5/1986 | Kurzweg | 165/104.91 |
| 4,797,588 | 1/1989 | Capion | 310/54 |
| 5,140,204 | 8/1992 | Cashmore et al. | 310/61 |
| 5,219,020 | 6/1993 | Akachi | 165/104.26 |

FOREIGN PATENT DOCUMENTS 4-190090  7/1992  Japan .

*Primary Examiner*—Thomas M. Dougherty
*Assistant Examiner*—Timothy A. Williams
*Attorney, Agent, or Firm*—McDermott, Will & Emery

[57] ABSTRACT

It is an object of the present invention to provide an electric motor for an electric vehicle with an improved cooling capacity by causing coils wound around a stator to serve as a tubular heat pipe type heat transfer device. An electric motor for an electric vehicle includes a stator 11, coils 12 wound around at least the stator, and a rotor 13 being rotated by an induction field developed around the coils 12. In one embodiment of the invention the coils 12 are formed of a tubular container 121 which is filled with a working fluid which vibrates in an axial direction of a tube by nuclear boiling generated at a high temperature portion of the coils 12. The coils themselves are arranged as a non-looped tubular heat pipe type heat transfer device.

6 Claims, 5 Drawing Sheets

ELECTRIC MOTOR FOR AN ELECTRIC VEHICLE

BACKGROUND OF THE INVENTION

1. Field of the Invention

The present invention relates to an electric motor for an electric vehicle having an improved cooling capacity.

2. Description of the Related Art

A conventional known electric motor for an electric vehicle is supplied with power, for example, from a loaded battery to coils wound around a stator, so that a driving force is generated by a rotor being rotated by an induction field developed around the coils. As the electric motor for an electric vehicle cannot be cooled with a cooling device of a large capacity in view of its use for a vehicle, cooling cooper pipes are conventionally passed through four corners of the stator (four corners in relation to a plane of the stator) in a direction of rotation, and cooling water is forced to be circulated through a cooling water inlet to cool the motor.

However, as folded portions located at right and left sides of the coils are not cooled sufficiently, the power current cannot be made too high, therefore, there is a problem that the electric motor itself cannot be miniaturized. Thus, if a higher power current can be supplied by enhancing a cooling capacity, miniaturization of the motor is made possible and a running distance is extended.

SUMMARY OF THE INVENTION

It is an object of the present invention to provide an electric motor for an electric vehicle with an improved cooling capacity by causing the coils themselves wound around a stator to serve as a tubular heat pipe type heat transfer device.

With reference to an embodiment shown in FIG. 1, the present invention is applied to an electric motor for a vehicle comprising a stator 11, coils 12 wound around the stator 11, and a rotor 13 rotated by an induction field developed around the coils 12.

The above object is achieved by forming the coils 12 with a pipe to provide a tubular container 121 therein, filling the tubular container 121 (FIG. 4) with the working fluid which vibrates in an axial direction of a tube by a nuclear boiling generated at a high temperature portion of the coils 12 to transfer the heat to a heat radiating portion, and forming the coils 12 themselves as a non-looped tubular heat pipe type heat transfer device.

An electric motor for an electric vehicle according to claim 1, as shown in FIGS. 1 and 2, further comprises a cooling device 14 contacting the heat radiating portion of the coils 12. The cooling device 14 may be formed as a water cooling type as shown in FIG. 5.

An electric motor for an electric vehicle according to claim 4 is the one wherein, in the electric motor according to claim 1, the cooling device is formed as a tubular heat pipe type heat transfer device 21 which comprises, as shown in FIG. 6, a tubular container 212 and a working fluid which is filled in the tubular container 212 and vibrates in an axial direction of a tube by a nuclear boiling generated in a heat receiving portion contacting the coils 12 to transfer the heat to the heat radiating portion.

An electric motor for an electric vehicle according to claim 5 is the one wherein, in the electric motor according to any one of claims 1, 3 and 4, the cooling device 14 (21) is arranged perpendicularly to an axial direction of the coils 12 wound around the stator 11 in plural turns in order that at least one heat radiating portion is provided with each one turn of the coils 12.

An electric motor for an electric vehicle according to claim 6 comprises coils 12 formed from an oxygen-free copper.

According to the present invention, a heat generated in the coils 12 is transferred to the heat radiating portion by its heat transferring function. In other words, the working fluid is vibrated in the axial direction of the tube by the nuclear boiling generated at the high temperature portion to transfer the heat to the heat radiating portion.

According to the electric motor for an electric vehicle of claim 1, the cooling device 14 forms the heat radiating portion of the coils 12. As a temperature difference between the high temperature portion and the heat radiating portion of the coils 12 becomes larger, a heat transfer efficiency is further improved. When the tubular heat pipe type heat transfer device 21 is used as the cooling device, as claimed in claim 4, the cooling device 21 can be further miniaturized.

According to the electric motor for an electric vehicle of claim 5, one portion of each turn of the coils 12 wound in plural turns contacts the cooling device 14 (21), and the radiating portion is formed at plural positions of the coils 12. Accordingly, the vibration in the axial direction of the pipe tends to generate effectively, and the heat transfer efficiency is further improved.

According to the electric motor for an electric vehicle of claim 6, the coils 12 formed from the oxygen-free copper has a little impurity, and the nuclear boiling portion tends to be easily defined at a heat generating portion.

As described above, according to the electric motor for an electric vehicle of the present invention, the coils themselves are constructed as a tubular heat pipe type heat transfer device and heat is effectively transferred from a high temperature portion to a low temperature portion of the coils. Thereby, compared with the conventional motor in which the heat generated from the coils is transmitted to the water cooling type cooling device to cool the coils, the coils can be cooled more efficiently, the motor can be driven by a higher current, and a more compact and higher output motor is obtained.

When the heat radiating portion of the coils is forced to contact a separate cooling device, a temperature difference between the heat radiating portion and the high temperature portion of the coils will become larger, and the cooling efficiency will be further improved. In this case, a further cooling efficiency would be obtained if the tubular heat pipe type heat transfer device is used as the cooling device. When the cooling device or the tubular heat pipe type heat transfer device is arranged perpendicularly to an axial direction of the coils, so that it contacts them and at least the heat radiating portion is arranged at each turn of the coils wound in plural turns between a pair of slots, the heat can be effectively transferred from the high temperature portion of the coils to the heat radiating portion of its contact portion, and a cooling efficiency is improved further.

It is to be noted that the drawings of embodiments which are referred to in the above description do not limit the scope of the present invention to those embodiments.

BRIEF DESCRIPTION TO THE DRAWINGS

DETAILED DESCRIPTION OF THE PREFERRED EMBODIMENT

First Embodiment

Figure 1:
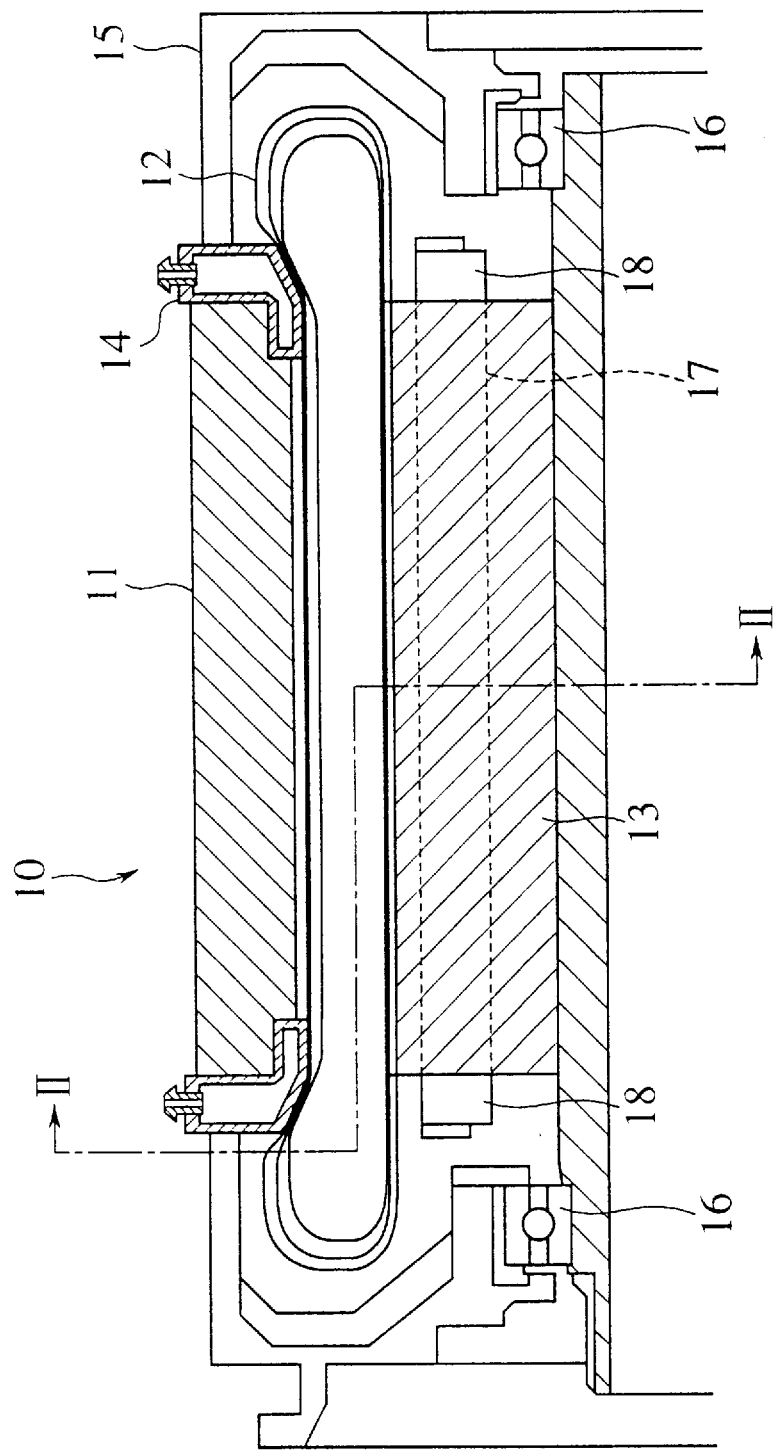
FIG. 1 is a sectional view cut along a rotation shaft of an electric motor for an electric vehicle according to a first embodiment of the present invention.
Figure 2:
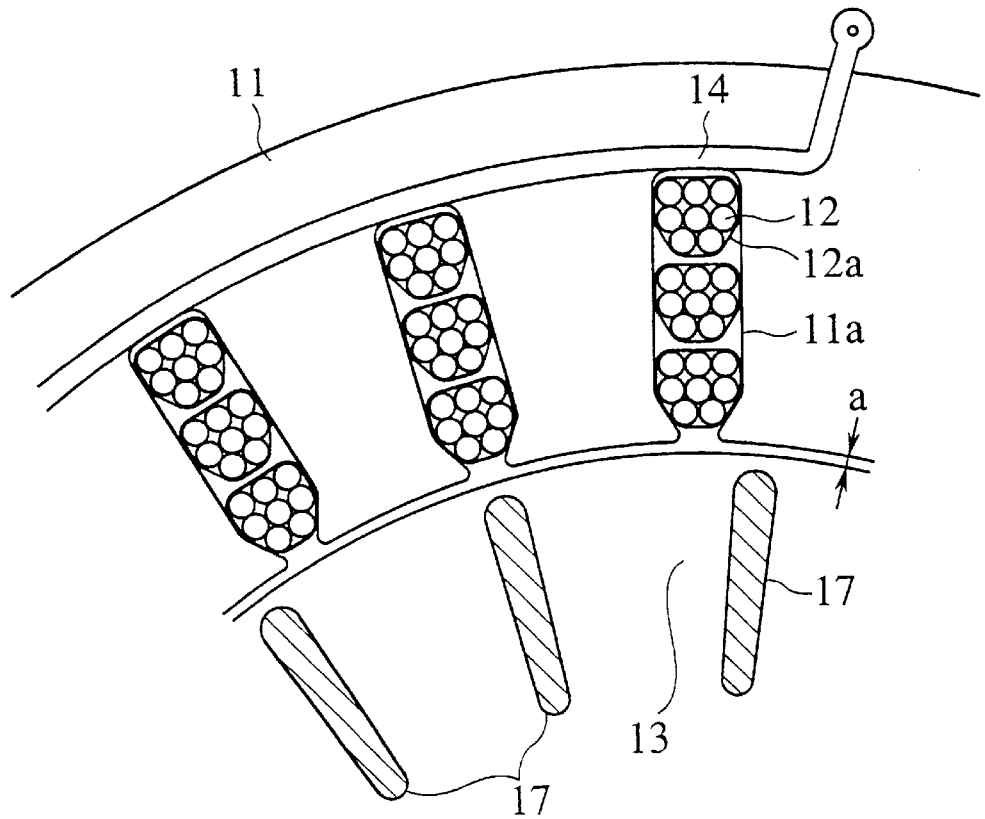
FIG. 2 is a view along a line II—II of FIG. 1.

FIGS. 1 and 2 show an electric motor for an electric vehicle according to a first embodiment of the present invention. FIG. 1 is a sectional view along a rotation shaft, FIG. 2 is a view along a direction of line II—II in FIG. 1.

The electric motor for the electric vehicle includes a laminated type stator 11 shaped like a ring and provided with slots 11a arranged in a predetermined pitch at an inner periphery side. The electric motor includes coils 12 wound around and extended between a pair of slots 11a and coated by insulating material 12a for each group of them. The electric motor has a rotor 13 rotatably arranged with an air gap "a" at an inside of the stator 11. The coils 12 themselves serve as a heat transferring device to effectively transfer heat from a heat receiving portion of high temperature, which will be referred to as a high temperature portion, to a heat radiating portion of low temperature, which will be referred to as a low temperature portion, hereinafter. As shown in FIGS. 1 and 2, arranged on right and left end surfaces of the stator 11 is a cooling device 14 which extend like a ring such that the cooling device 14 contacts the most outer group of the coils 12. It is to be noted that a part of the coils which contacts the cooling device 14 is a heat radiating part (low temperature portion).

Reference character 15 is a motor casing, 16 is a bearing fixed to the motor casing 15, and supporting the rotating rotor 13, 17 is a rotor bar passing through the rotor 13 in a direction of the rotating shaft. Reference character 18 is an end ring to fix the rotor bar 17.

For the coils 12 which serve as the heat transfer device, a device utilizing a principal of a capillary heat pipe, such as disclosed in for example, Japanese Patent Publications (KOKAI) 4-190090 (KOKOKU) 2-35239 can be used. The coils 12 are described below in more detail.

Figure 3:
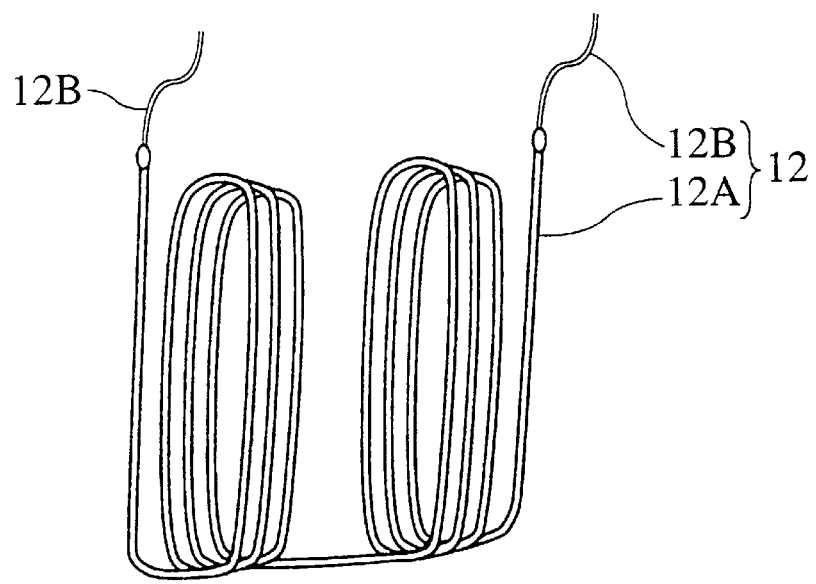
FIG. 3 is a view showing coils of the electric motor for an electric vehicle according to FIG. 1.
Figure 4:
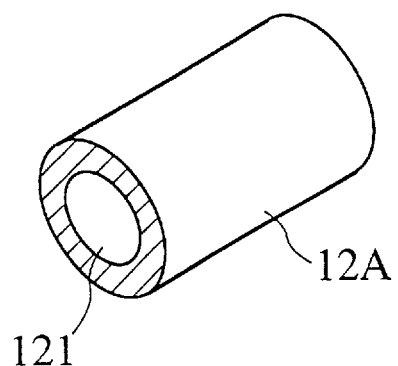
FIG. 4 is a view showing an element of the coils according to FIG. 2.

FIG. 3 shows the coils 12 wound around the pair of slots 11a in several turns. The coils 12 are composed of a pipe, as shown in FIG. 4, having an outer diameter of about 1 mm and an inner diameter of about 0.8 mm, and comprise a body portion 12A closed at both ends to form a tubular container 121 therein. Lead lines 12B formed of a solid copper line are connected to the ends of body portion 12A. In the tubular container 121, a two-phase condensable working fluid such as a pure water or freon is filled by a suitable method. It is preferred that the coils 12 are made from an oxygen-free copper. At least 3 sets of such coils 12 are required for a 3 phase induction motor.

Next, the principle of a heat transfer by the coils 12 is described. When heat is locationally generated at the coils 12 by an operation of the motor, the working fluid inside the heat generating portions of the coils 12 comes to the boiling, so that pressure waves are produced. Note, the boiling will be referred as "nuclear boiling" since steam bubbles are produced at a boundary surface between an inner wall of the tubular container 121 and the working fluid contained in the container 121. Owing to the nuclear boiling, some groups of steam bubbles are generated. In the embodiment, since some portions of the coils 12 form the heat generating portions, the working fluid is vibrated in the axial direction of pipe (coils) by an interaction of nuclear boiling caused at the respective portions of the coils 12. In addition to an inner wall of the container 121, a boundary layer of the vibrating working fluid in the vicinity of the inner wall of the container 121 also serves as heat medium. Thus, since a severe heat equalizing function is produced in the working fluid, the generated heat can be effectively transferred from the high temperature portion to the lower temperature portion. As such a principle is described in detail in the above Japanese Patent Publications (KOKAI) 4-190090 and (KOKOKU) 2-35239, and is known in the art, a further detailed description will be omitted.

A cooling operation of this kind of the electric motor for the electric vehicle will be described. As described above, a nuclear boiling of the working fluid is generated at the high temperature portion of the coils 12. The high temperature portion is formed at a plurality of portions of the tubular container 121, the nuclear boilings are generated at a plurality of portions, and a vibration in an axial direction of a tube is generated in the working fluid between the high temperature portion and the low temperature portion. Thereby the heat is transferred by the vibration from the high temperature portion to the heat radiating portion (low temperature portion). The efficiency of a heat transfer by a circulation of the working fluid will become worse as a diameter of the tube becomes smaller because of an increase of pressure loss in the tube. However, the efficiency of a heat transfer by a vibration in the axial direction will become better as the diameter of the tube becomes smaller because the vibration is generated more easily by a reduction of a volume of the fluid to be vibrated.

As the coils themselves are arranged to serve as a capillary heat pipe, and the cooling device 14 is arranged perpendicularly to the coils 12 so as to provide the heat radiating portion with at least one portion in each turn of the coils 12, the heat generated in the coils 12 is effectively transferred to the low temperature portion. As a result the temperature of the coils 12 can be lower than the temperature of corresponding conventional coils, and the high motor power current is allowed. Consequently, the output force of the motor can be increased without increasing its size.

Second Embodiment

Figure 5:
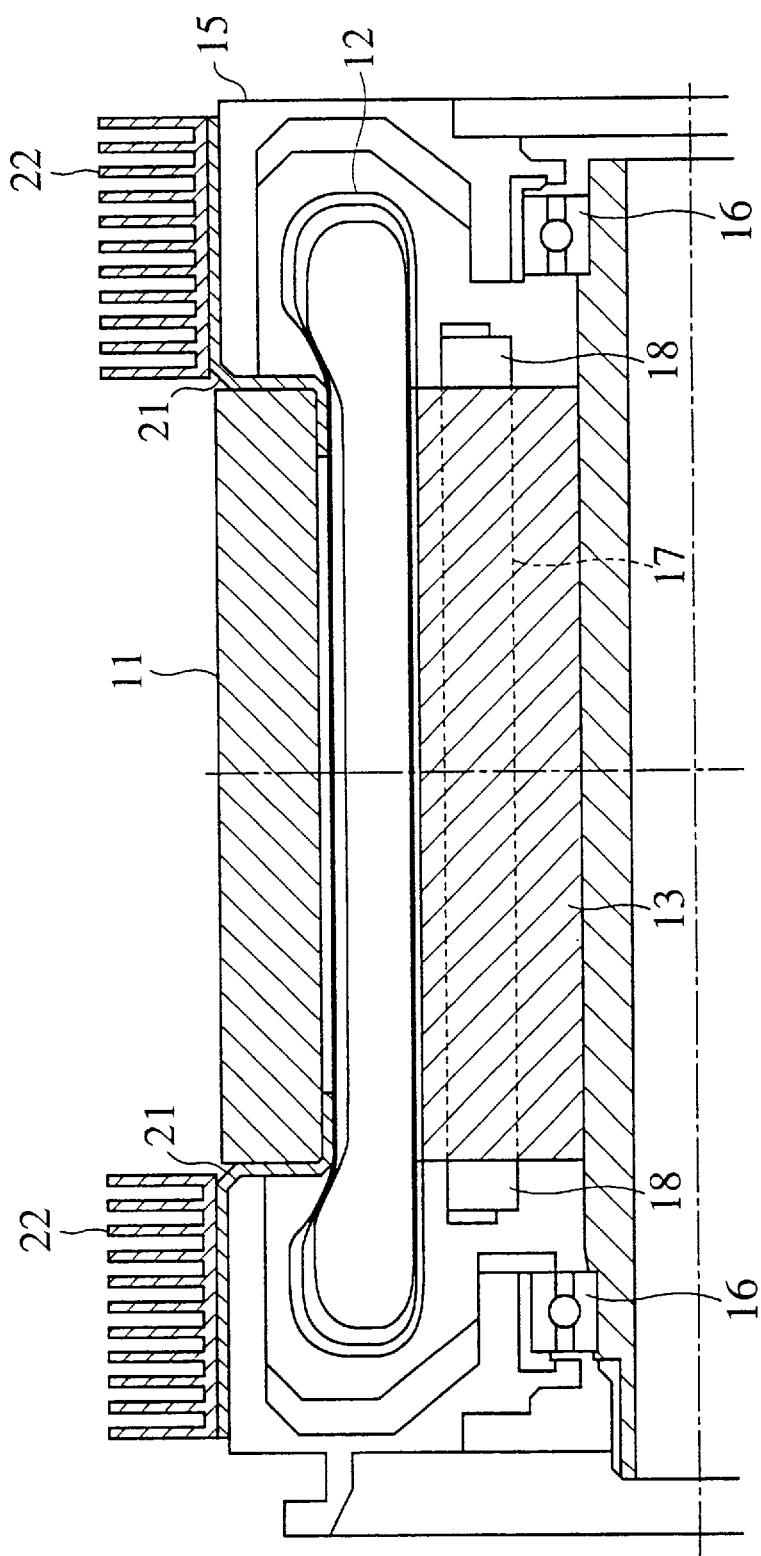
FIG. 5 is a sectional view cut along a rotation shaft of an electric motor for an electric vehicle according to a second embodiment of the present invention.

FIG. 5 is a view showing an electric motor for an electric vehicle according to a second embodiment of the present invention. In FIG. 5, the same reference numerals are applied to the same parts shown in FIGS. 1 and 2, and the differences are described mainly.

Figure 6A:
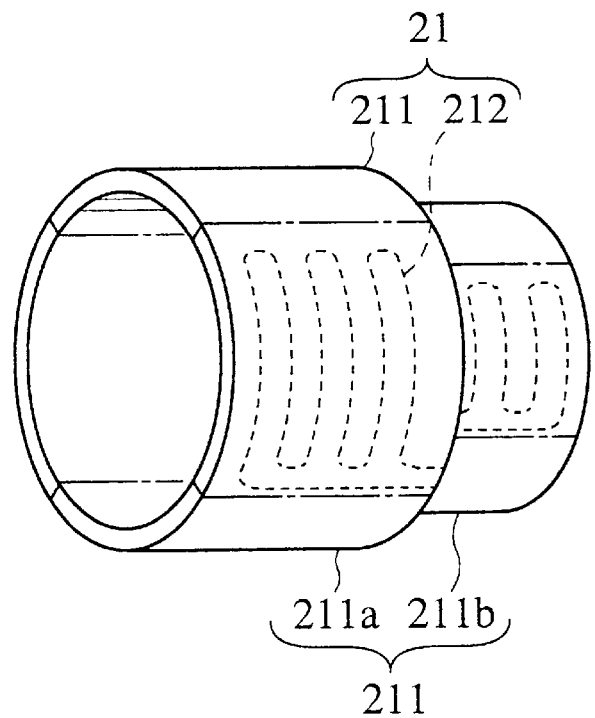
FIG. 6A is a perspective view of a heat transfer device in FIG. 5.
Figure 6B:
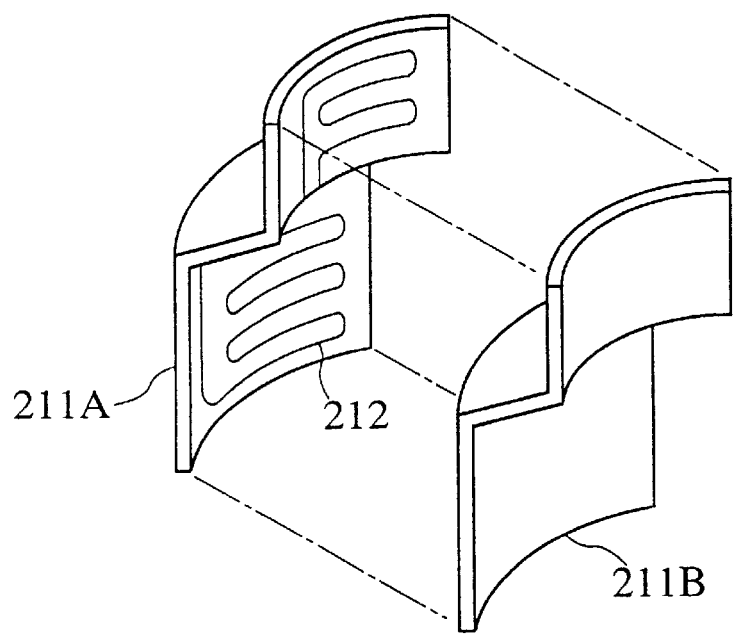
FIG. 6B is a perspective view of a segment of a sleeve body.

With the second embodiment, a heat transfer device 21 of a capillary heat pipe type is provided instead of the cooling device 14, and heat radiating fins 22 receiving a heat from a heat radiating portion of the heat transfer device 21 are arranged on an outer peripheral surface of the motor casing 15. The heat transfer device 21 is composed of a tubular container 211 defined in a tubular body 211 of a shape as is shown in the FIGS. 6A and 6B, and a two-phase condensable working fluid, which is the same as that in the first embodiment, is filled therein. The tubular body 211 is composed of a large diameter portion 211a arranged along the outer peripheral surface of the motor casing 15 and a small diameter portion 211b having a diameter corresponding to that of the inner peripheral surface of the stator 11 and contacting the coils 12.

The heat transfer device 21 is divided into, for example, 4 segments, each being formed of two plates 211A and 211B made from an oxygen-free copper by pressing or drawing and connected to each other. On a connecting surface of one of the two plates, a loop like tubular container 212 is formed by a pressing process or an etching process. It is preferable that a thickness of the two connected plates 211A and 211B is about 0.5 mm–1.0 mm, and a diameter of the tubular container 212 is about 0.3 mm–0.5 mm.

The large diameter portion 211a is arranged to contact the heat radiating fins 22 to form a heat radiating portion, and the small diameter portion 211b is arranged to contact the coils to form a heat receiving portion. Therefore, it is preferable to form the tubular container so that it intersects the coils perpendicularly at the heat receiving portion.

In such a second embodiment, as in the first embodiment, the heat generated by the coils themselves is transferred by the tubular heat pipe to the heat receiving portion of the heat transfer device 21, which is the low temperature portion. The heat transfer device 21 being composed of the tubular heat pipe also transfers the heat to the heat radiating fins 22 in accordance with the same principle. The heat radiating fins 22 radiate the heat to the outside. According to the above operation, the coils can be cooled more effectively as compared with the first embodiment.

According to the second embodiment, as the tubular heat pipe type heat transfer device is employed instead of the water cooling type cooling device of the first embodiment, a highly efficient cooling utilizing the heat transfer by the vibration of the working fluid in the axial direction of the pipe is attained, with a result that, as the heat transfer efficiency of the coils themselves by the tubular heat pipe is improved, a small sized electric motor for an electric vehicle with a large output force is provided.

It is to be noted that the cooling device 14 or the heat transfer device 21 may be omitted when the capacity of the electric motor is small or the stator 11 itself has a high cooling capacity.

What is claimed is:

1. An electric motor for an electric vehicle comprising:

a stator;

coils wound around the stator and extending beyond axial end surfaces of the stator, the coils including an electrically conductive material and generating an induction field, the coils having a heat receiving portion of high temperature and a heat radiating portion of low temperature;

a rotor arranged inside of the stator and rotated by the induction field developed around the coils; and a cooling device arranged on at least one of said axial end surfaces and under an inner stator portion, said cooling device being in contact with the heat radiating portion of the coils and being further arranged perpendicularly to an axial direction of the coils wound around the stator in plural turns in order that at least one heat radiating portion is arranged in each one turn of the coils;

wherein the coils are made from a pipe providing a tubular container filled with working fluid, the working fluid having vibrating characteristics in an axial direction of the pipe by a nuclear boiling generated at the heat receiving portion of the coils thereby to transfer a heat from the heating receiving portion to the heat radiating portion.

2. An electric motor for an electric vehicle according to claim 1, wherein the cooling device is of a water cooling type.

3. An electric motor for an electric vehicle comprising:

a stator;

coils wound around the stator, the coils including an electrically conductive material and generating an induction field, the coils having a heat receiving portion of high temperature and a heat radiating portion of low temperature, wherein the coils are made from a pipe providing a tubular container filled with working fluid, the working fluid having vibrating characteristics in an axial direction of the pipe by a nuclear boiling generated at the heat receiving portion of the coils thereby to transfer a heat from the heating receiving portion to the heat radiating portion;

a rotor arranged inside of the stator and rotated by the induction field developed around the coils; and a cooling device which is in contact with the heat radiating portion of the coils;

wherein the cooling device is a tubular heat pipe type heat transfer device which includes a tubular container and a working fluid with which the tubular container is filled and which is vibrated in the axial direction of the tube by a nuclear boiling generated in a heat receiving portion being in contact with the coils to transfer the heat to the heat radiating portion.

4. An electric motor for an electric vehicle according to claim 1, wherein the coil is made of oxygen-free copper.

5. An electric motor for an electric vehicle according to claim 3, wherein the cooling device is of a water cooling type.

6. An electric motor for an electric vehicle according to claim 3, wherein the coil is made of oxygen-free copper.

* * * * *